(No Model.)

H. P. BOOTH.
DENTAL MATRIX.

No. 388,620.  Patented Aug. 28, 1888.

WITNESSES:
Chas. Nida.
D. A. Carpenter.

INVENTOR,
Henry P. Booth,
BY
ATTORNEY.

UNITED STATES PATENT OFFICE.

HENRY P. BOOTH, OF CHIPPEWA FALLS, WISCONSIN.

DENTAL MATRIX.

SPECIFICATION forming part of Letters Patent No. 388,620, dated August 28, 1888.

Application filed June 1, 1888. Serial No. 275,760. (No model.)

*To all whom it may concern:*

Be it known that I, HENRY P. BOOTH, of Chippewa Falls, in the county of Chippewa and State of Wisconsin, have invented a certain new and useful Improvement in Dental Matrices, of which I declare the following to be a full, clear, and exact description, reference being had to the accompanying sheet of drawings, forming part of this specification.

This invention relates to improvements in dental matrices, which are employed to facilitate the filling of cavities in the approximal faces of teeth; and the invention consists of a dental matrix constructed in the manner herein described and claimed.

Figure 1:
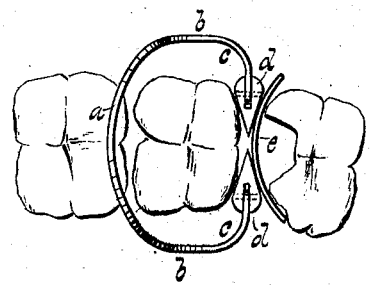
Figure 2:
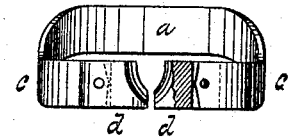
Figure 3:
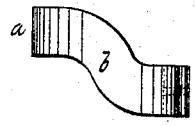

In the accompanying sheet of drawings, Figure 1 is a top view of the matrix in use; Fig. 2, a front view of spring-connected clamping-wedges; Fig. 3, a side view of the same.

Similar letters of reference indicate like parts in the several figures.

The particular purpose of this invention is to improve the dental matrix described in my previous application, No. 262,203, filed January 28, 1888. In that matrix the artificial wall of the cavity is held in place by wedge-shaped jaws rigidly secured to the ends of a curved spring-band, the jaws, when the device is in use, being inserted between the artificial wall and the tooth immediately behind it, so as to press the wall snugly against the edges of the cavity. In some cases inconvenience is occasioned when the wedging-jaws are rigidly connected to the spring, because of irregularity in the surfaces of the teeth, in consequence of which the jaws are not permitted to bear evenly against the metallic wall, and it is with a view to obviate this objection to the matrix in its original form that I now construct it as here described. The clamping portion is formed with the central spring-band, $a$, and sides $b\ b$, extending downward therefrom and turned sharply inward at $c\ c$, and is substantially the same in the respects thus far indicated as the clamp of my previous application. The wedge-shaped jaws $d\ d$, however, are in my improved device pivoted to the ends of the spring-band and permitted to turn slightly upon the pivots. The matrix plate or strip $e$ is of the ordinary form used in other matrices. The pivoted jaws being constructed to turn, as described, upon the ends of the spring-band $a$, the device adjusts itself to inequalities in the teeth, and becomes capable of use in positions where it might be difficult or impracticable to use it were the jaws always rigidly secured to the band.

The application of the device to the cavity in the tooth is the same in the case of the improved matrix as of the original, the strip $e$ being inserted between the decayed tooth and the one adjacent thereto, and wedged tightly against the edges of the cavity by the jaws $d\ d$, which are introduced on opposite sides of the row of teeth between the strip and the surface of the tooth proximate on the side of the cavity to the tooth to be filled.

Having now described my invention what I claim as new, and desire to secure by Letters Patent, is—

In combination, an artificial wall for a dental cavity, consisting of a strip, $e$, placed between the teeth and substantially at right angles to the row of teeth, and two wedges, $d\ d$, pivoted to a connecting-spring, $a$, as and for the purpose described.

HENRY P. BOOTH.

In presence of—
D. A. CARPENTER,
GEO. M. FIELD.